UNITED STATES PATENT OFFICE.

SERVETUS T. ACHOR, OF BROOKLYN, NEW YORK.

SOLUBLE CHOCOLATE.

SPECIFICATION forming part of Letters Patent No. 479,580, dated July 26, 1892.

Application filed February 6, 1892. Serial No. 420,555. (No specimens.)

*To all whom it may concern:*

Be it known that I, SERVETUS T. ACHOR, residing at Brooklyn, in the county of Kings and State of New York, have invented certain new and useful Improvements in Confectionery, of which the following is a specification.

My invention relates to an improvement in a composition which is both a candy or confection and which at the same time is a basis for forming a chocolate beverage without the necessity of boiling. To make this composition, I use chocolate or cocoa liquor, sugar and cream in about the proportions of one pound of chocolate, one and one-half pounds of sugar, and one pint of cream or condensed milk. These ingredients are combined with heat into a thick paste and an additional amount of sugar is then incorporated until the mass becomes stiff enough to mold and handle. The additional amount of sugar serves to absorb and diffuse the cocoa-butter contained in the chocolate without destroying the granular characteristics of the sugar, so that the compound when put into hot water will readily dissolve, the sugar uniting with the water, carrying with it the cocoa-butter, and rendering the whole compound susceptible to the action of the water, so that it can be readily dissolved thereby. I mold this compound into pieces or cakes of suitable size and then immerse such pieces in a thick sirup of sugar and water until they are covered with crystallized sugar, when they are removed from the sirup and allowed to dry. This produces a hard close covering of sugar all over the central mass, excluding the air and preventing fermentation and evaporation, so that the completed confection will keep indefinitely. This confection will dissolve readily in hot water without boiling and will then form a delicious beverage. Ordinary chocolate and cocoa cannot be so dissolved without boiling, so that I obtain a great advantage over all other solid preparations in which chocolate or cocoa is the chief ingredient, for the combination of the ingredients in the way I have stated enables the chocolate and cocoa-butter to be carried readily into solution with the other dissolving ingredients. The crystallized coating also dissolves quickly and entirely in hot water, leaving no residuum.

I do not herein claim the process of forming the article claimed, the same being subject-matter of application, Serial No. 420,554, filed February 6, 1892.

I claim—

1. A cake composed of chocolate, cream, and sugar and having incorporated therewith such an additional amount of sugar as will render the cake readily disintegrable in water, substantially as described.

2. A cake composed of chocolate, cream, and sugar and having incorporated therewith such an additional amount of sugar as will render the cake readily disintegrable in water and provided with a protective coating.

3. A cake composed of chocolate, cream, and sugar and having incorporated therewith such an additional amount of sugar as will render the cake readily disintegrable in water and provided with a protective crystalline saccharine coating.

SERVETUS T. ACHOR.

Witnesses:
  WM. D. NEILLEY,
  ISAAC B. RIPINSKY.